United States Patent
Mikhail et al.

(10) Patent No.: US 7,759,017 B2
(45) Date of Patent: Jul. 20, 2010

(54) MEMBRANE ELECTRODE ASSEMBLY (MEA) ARCHITECTURE FOR IMPROVED DURABILITY FOR A PEM FUEL CELL

(75) Inventors: Youssef M. Mikhail, Sterling Heights, MI (US); Gayatri Vyas, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1015 days.

(21) Appl. No.: 11/131,529

(22) Filed: May 18, 2005

(65) Prior Publication Data
US 2006/0263668 A1    Nov. 23, 2006

(51) Int. Cl.
*H01M 2/14* (2006.01)
*H01M 8/04* (2006.01)
*H01M 8/10* (2006.01)

(52) U.S. Cl. .................. 429/512; 429/479; 429/490; 428/317.9; 428/319.1

(58) Field of Classification Search .................. None
See application file for complete search history.

(56) References Cited

U.S. PATENT DOCUMENTS

| | | | |
|---|---|---|---|
| 3,953,566 A * | 4/1976 | Gore | 264/505 |
| 5,036,252 A | 7/1991 | Lob | |
| 5,086,035 A | 2/1992 | Hung et al. | |
| 5,441,819 A * | 8/1995 | Voss et al. | 429/13 |
| 5,707,755 A | 1/1998 | Grot | |
| 5,726,524 A | 3/1998 | Debe | |
| 5,759,712 A * | 6/1998 | Hockaday | 429/30 |
| 5,888,593 A | 3/1999 | Petrmichl et al. | |
| RE37,284 E | 7/2001 | Li et al. | |
| 6,350,539 B1 | 2/2002 | Wood et al. | |
| 6,372,376 B1 | 4/2002 | Fronk et al. | |
| 6,426,863 B1 | 7/2002 | Munshi | |
| 6,811,918 B2 | 11/2004 | Blunk et al. | |
| 6,866,958 B2 | 3/2005 | Vyas et al. | |
| 2002/0081478 A1 | 6/2002 | Busenbender | |
| 2003/0194599 A1 * | 10/2003 | Sassa et al. | 429/42 |
| 2004/0001993 A1 * | 1/2004 | Kinkelaar et al. | 429/40 |
| 2004/0005502 A1 * | 1/2004 | Schlag | 429/245 |
| 2005/0221134 A1 * | 10/2005 | Liu et al. | 429/13 |

(Continued)

OTHER PUBLICATIONS

Academic Press Dictionary of Science and Technology, 1992, [online], [retrieved on Feb. 11, 2009], Retrieved from Credoreference using Internet <URL: http://www.credoreference.com/entry/3130033/>.*

(Continued)

*Primary Examiner*—Dah-Wei D Yuan
*Assistant Examiner*—Katherine Turner
(74) *Attorney, Agent, or Firm*—Harness, Dickey & Pierce, P.L.C.

(57) ABSTRACT

An electrically conductive fluid distribution element for use in a fuel cell having a layer of a conductive non-metallic fiberless microporous media. In certain embodiments, an electrically conductive metal is deposited along a surface of the element to form one or more metallized regions. The metallized regions are arranged to contact a membrane electrode assembly (MEA) in a fuel cell assembly, and thus improve electrical conductance at contact regions between the MEA and the layer of media. Methods of making such a fluid distribution element and operating fuel cell assemblies are also provided.

24 Claims, 5 Drawing Sheets

U.S. PATENT DOCUMENTS

2007/0072036 A1* 3/2007 Berta et al. .................. 429/33

OTHER PUBLICATIONS

Microporous barrier (Academic Press Dictionary of Science and Technology, 1992, [online], [retrieved on Aug. 18, 2009], Retrieved from Credoreference using Internet <URL: http://www.credoreference.com/entry/ apdst/microporous_barrier>).*

Park et al. (Gu-Gon Park, Young-Jun Sohn, Sung-Dae Yim, Tae-Hyun Yang, Young-Gi Yoon, Won-Yong Lee, Koichi Eguchi, and Chang-Soo Kim, Adoption of nano-materials for the micro-layer in gas diffusion layers of PEMFCs, Journal of Power Sources, 2006, vol. 163, pp. 113-118).*

* cited by examiner

MEMBRANE ELECTRODE ASSEMBLY (MEA) ARCHITECTURE FOR IMPROVED DURABILITY FOR A PEM FUEL CELL

FIELD OF THE INVENTION

The present invention relates to electrochemical cells, and more particularly to electrically conductive fluid distribution elements and the manufacture and operation of fuel cells incorporating such fluid distribution elements.

BACKGROUND OF THE INVENTION

Fuel cells have been proposed as a power source for electric vehicles and other applications. One known fuel cell is the PEM (i.e., Proton Exchange Membrane) fuel cell that includes a so-called "membrane electrode assembly" (MEA) comprising a thin, solid polymer membrane-electrolyte having an anode on one face of the membrane-electrolyte and a cathode on the opposite face of the membrane-electrolyte. A polymer selected for use as a PEM desirably has unique characteristics including permeability to protons and electrical insulation. In practice, polymers that fulfill these requirements tend to be relatively fragile and thin, with a typical thickness of approximately 10 to 125 µm. When adding the electrodes to the PEM to form the MEA, the PEM is subjected to relatively high stress conditions including both high temperature and pressure. Since the PEM membrane is fragile, it is handled and processed carefully to minimize physical tears or thinning.

The MEA is sandwiched between a pair of electrically conductive porous fluid distribution media layers. The MEA together with the fluid distribution elements form a compliant layer, which is then sandwiched between a pair of electrically conductive contact elements (generally called bipolar or separator plates) that serve as current collectors for the anode and cathode, and further often contain appropriate channels and openings for distributing the fuel cell's gaseous reactants (i.e., $H_2$ & $O_2$/air) over the surfaces of the respective anode and cathode.

Diffusion media are typically made from fibers (preferably carbon or graphite fibers) or metals, such as foams or screens. Such diffusion media generally has the potential for manufacturing flaws, including small protrusions (such as protruding fibers) that may potentially cause damage to the MEA. Further, separator plate contact with adjacent elements is achieved by the application of compressive force, and must be optimized to enhance fuel cell operation without causing damage to the MEA. Overall, the associated components and assembly contacting the MEA can lead to excessive wear and strain, shortening the lifespan of the fuel cell. There is a need for a protective layer to cushion the MEA, while not detracting from electrical performance of the fuel cell, nor adding excessive cost to the fabrication of the fuel cell. There remains the challenge to optimize fuel cells, including the diffusion media elements and assemblies made therefrom in a fuel cell to promote efficiency, electrical conductivity, and MEA durability as cost-effectively as possible.

SUMMARY OF THE INVENTION

One aspect of the present invention relates to a fluid distribution element for a fuel cell having a membrane electrode assembly (MEA). The element comprises a layer comprising electrically conductive fiberless microporous distribution media. A surface of the layer has one or more metallized regions. The one or more metallized regions contact a major surface of the MEA and form respective electrically conductive paths between the MEA and the media.

Another aspect of the present invention relates to a method of operating a fuel cell comprising positioning an electrically conductive fiberless microporous distribution media between a membrane electrode assembly (MEA) and an electrically conductive substrate. The microporous media has a first surface confronting the MEA and a second surface confronting the conductive substrate. The one or more regions of the first surface are contacted with the MEA and the one or more regions of the second surface are contacted with the substrate to form an electrically conductive path from the substrate through the microporous media to the MEA. Electrons are then conducted to or from the MEA via the electrically conductive path while operating the fuel cell.

In another aspect, the present invention provides a method for manufacturing an assembly for a fuel cell, comprising depositing an electrically conductive metal on a surface of an electrically conductive fiberless microporous media to form one or more metallized regions having an ultra-thin thickness. The microporous media comprises carbonized expanded-polytetrafluroethylene (ePTFE). The surface having the metallized regions is positioned adjacent to an electrode of a membrane electrode assembly (MEA). The electrode is contacted with the surface having the metallized regions to form an electrically conductive path between the substrate and the microporous media.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the preferred embodiments is merely exemplary in nature and is in no way intended to limit the invention, its application, or uses. The headings and subheadings used herein are intended only for general organization of topics within the disclosure of the invention, and are not intended to limit the disclosure of the invention or any aspect thereof. Subject matter disclosed in the "Summary of the Invention" is not an exhaustive or complete disclosure of the entire scope of the invention or any embodiments thereof.

DEFINITIONS

As used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the word "include," and its variants, is intended to be non-limiting, such that recitation of items in a list is not to the exclusion of other like items that may also be useful in the materials, compositions, devices, and methods of this invention.

As referred to herein, all compositional percentages are by weight of the total composition, unless otherwise specified.

As referred to herein, the word "substantially," when applied to a characteristic or property of a composition or method of this invention, indicates that there may be variation in the characteristic without having substantial effect on the chemical or physical attributes of the composition or method.

"Substantially free" is intended to mean that the property or characteristic is absent to the extent that it cannot be detected or it is still suitable to use the item for its intended purpose where the absence of the desired characteristic or property is required.

"About" when applied to values indicates that the calculation or the measurement allows some slight imprecision in the value (e.g., with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

As used herein, "major surface" refers to a surface of an element having a greater dimension or surface area than other surfaces of the element, for example, an element that has an aspect ratio of greater width to height, where the surface area of the side corresponding to the element's height (e.g., thickness) is significantly smaller than the surface area of the width of the same element.

"Compliant" is a characteristic indicating that a material has flexibility in at least one axial direction.

The term "fiberless" means a material is substantially free of elongated particles having an evident long axis with respect to which the particle body is symmetrical. Examples of elongated particles having an evident long axis, include, fibers, fibrils or filaments, or mixtures thereof, for example.

Unless otherwise indicated, "pore size" refers to an average or median value including both the internal and external pore diameter sizes. The terms "pore" and "pores" refers to pores of various sizes, including so-called "macropores" (pore size greater than 50 nanometers (nm) diameter), "mesopores" (pore sizes having diameter between 2 nm and 50 nm), and "micropores" (pore sizes less than about 2 nm or 20 Angstrom diameter). "Microporous" indicates that a majority of the pores in the material have pore sizes of less than about 2 nm.

"Ultra-thin" refers to thicknesses less than about 40 nm, and most preferably less than 15 nm.

Fuel Cell

The present invention relates to an improved fluid distribution media element for use in a fuel cell. The fluid distribution media element incorporated into a fuel cell assembly improves aspects of fuel cell operation, including: improved performance, electrical conductivity, efficiency, and durability.

Figure 1:
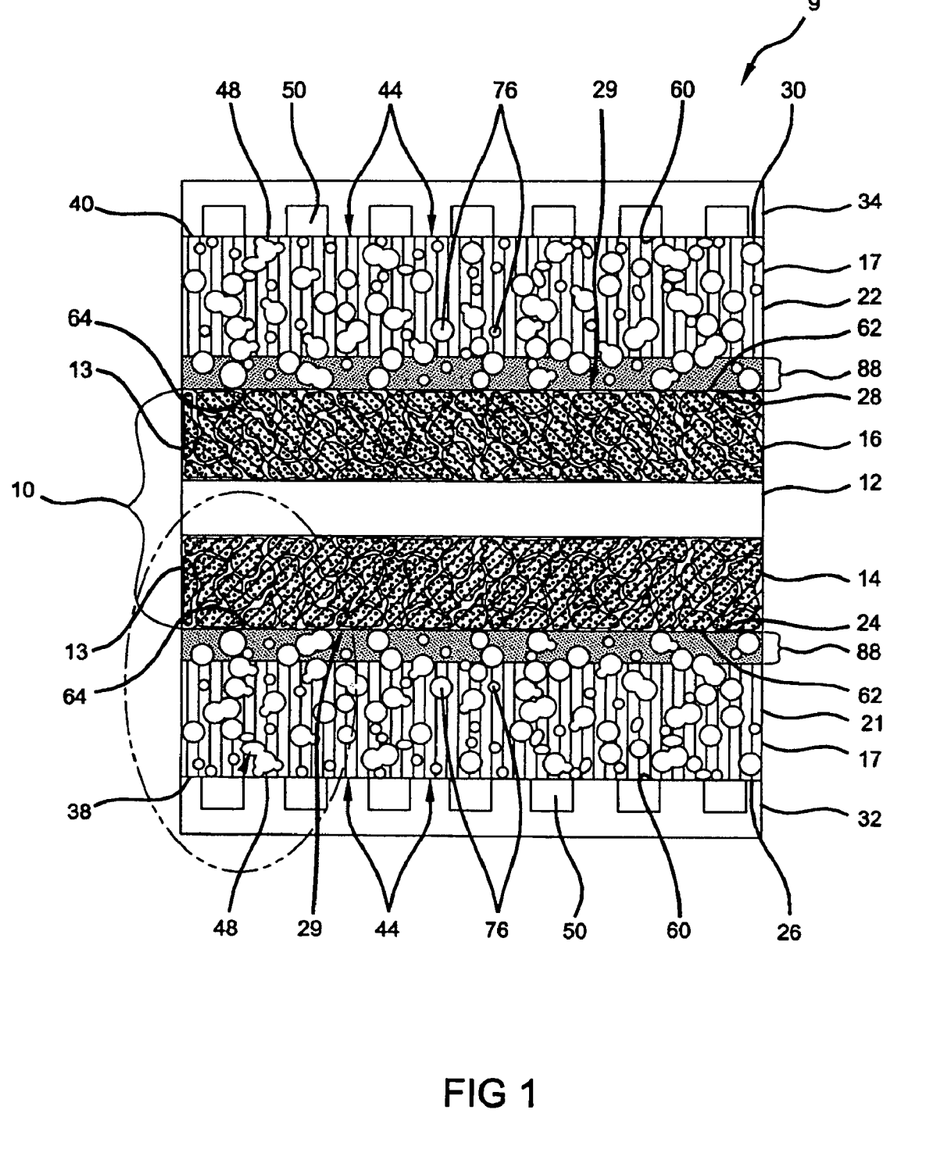
FIG. 1 is a not-to-scale side-sectional view of a fuel cell assembly having an membrane electrode assembly (MEA), fiberless microporous electrically conductive fluid distribution media with metallized regions applied to a surface thereof in accordance with the present invention, where the assembly also comprises separator elements.

One embodiment of an exemplary fuel cell assembly is shown in the FIG. 1. A fuel cell 9 comprises a membrane-electrode-assembly (MEA) 10. The MEA 10 comprises a proton exchange membrane (PEM) 12 sandwiched between two electrodes 13. One electrode is an anode 14 and the opposite electrode is a cathode 16, which are respectively bounded by electrically-conductive material known as porous "diffusion media" elements or layers 17 which distribute reactant gases to the MEA 10. Oxygen reactant is delivered to the cathode 16 and hydrogen reactant is delivered to the anode 14. Protons generated at the anode 14 migrate through the MEA 10 to the cathode 16 via the proton exchange membrane 12. Water is generated as a byproduct at the cathode 16 via the reaction of the protons with oxygen. In a simplified single fuel cell, the electrons released at the anode 14 are conducted through an external circuit (not shown) connected to the cathode 16 to generate electrical current.

Proton Exchange Membrane

The proton exchange membrane (PEM) 12 is a solid polymeric proton conductive recast ionomer membrane that transports $H^+$ ions. One broad class of cation exchange proton conductive resins well known in the art is the so-called sulfonic acid cation exchange resin, such as those sold under the trade name Nafion® sold by E.I. DuPont de Nemours & Co. Other similar membranes are sold by Asahi Glass and Asahi Chemical Company. The electrodes 13 are preferably well adhered to membrane 12 and provide proton transfer by intimate contact between each electrode 14,16 and the ionomer membrane 12.

Electrodes

Figure 2:
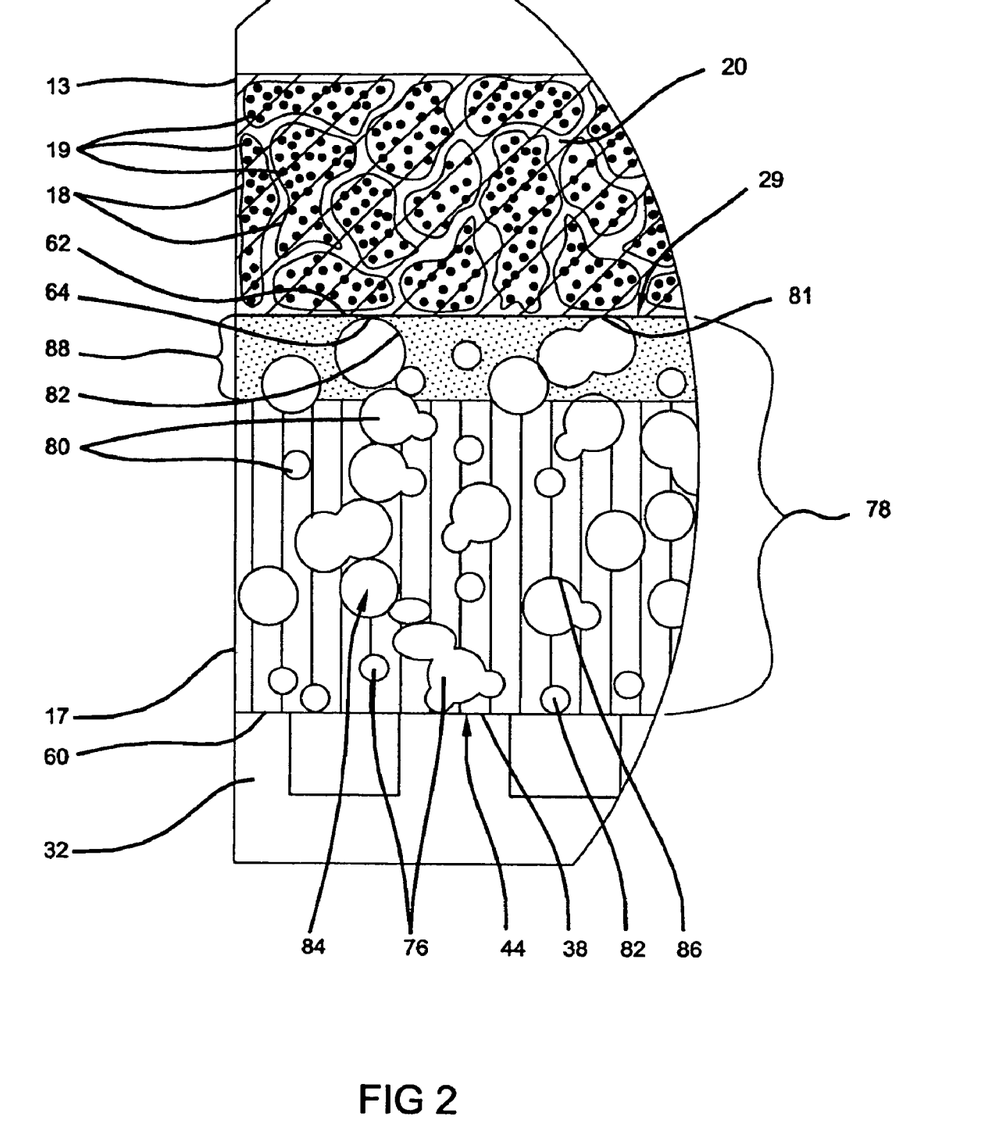
FIG. 2 is an exploded view of a section of FIG. 1 showing an electrically conductive fiberless microporous fluid distribution element.

As best shown in FIG. 2, a detailed view of a portion of FIG. 1, each of the electrodes 13 are formed of a corresponding group of finely divided electrically conductive carbon particles 18 supporting very finely divided electrically conductive catalytic particles 19. Proton (cation) conductive material 20 is intermingled with the carbon and catalytic particles 18, 19 to provide a continuous $H^+$ path to the catalyst 19 for reaction. The carbon particles 18 forming the anode 14 (FIG. 1) may differ from those forming the cathode 16 (FIG. 1). In addition, the catalyst 19 composition and/or loading at the anode 14 may differ from the catalyst 19 loading at the cathode 16. Although the characteristics and loading of the carbon particles 18 and the catalyst 19 may differ for anode 14 and cathode 16, the basic structure of the two electrodes 13 is otherwise generally similar.

One factor in catalyst 19 activity of the electrode 13 is the efficient transfer of electrons to the catalyst 19 (in addition to oxygen and proton transport). Hence, in one aspect, the present invention provides reduced contact resistance between the fluid distribution layer 17 and the conductive particles 18 of the electrode 13, which thus translates to improved catalyst activity by improved electron transfer to the catalyst particles 19.

Fluid Distribution Media

With renewed reference to FIG. 1, two fluid distribution media layers 17 flank each side of the MEA 10. A first fluid distribution media layer 21 confronts the anode 14, and a second fluid distribution media layer 22 confronts the cathode 16. The first fluid distribution media layer 21 comprises a first surface 24 and an opposing second surface 26. The first surface 24 of the first media layer 21 confronts and preferably contacts the anode electrode 14. The second fluid distribution media layer 22 likewise comprises a third surface 28 and an opposing fourth surface 30. The third surface 28 of the second media layer 22 confronts and preferably contacts the cathode 16. One or more electrical contact regions 29 are formed where the fluid distribution layers 17 contact the respective electrodes 13.

Generally speaking, the porous media layers 17 serve to (1) distribute gaseous reactant over the entire face of the MEA 10 (2) collect current from the MEA 10 and (3) structurally support the MEA 10. Reactant fluids are delivered to the MEA 10 via the fluid flow channels within the first and second porous media layers 21,22, where the electrochemical reactions occur and generate electrical current.

Separator Plate

Each porous media layer 21,22 is bounded by a current collector bipolar or separator plate (32 or 34) along the second and fourth surfaces 26,30, respectively. When the fuel cell 9 is assembled, the first separator plate 32 surface 38 contacts a second surface 26 of the first fluid distribution media layer 21 and a second separator plate 34 surface 40 contacts the fourth surface 30 of the second fluid distribution media layer 22. It is preferred that the fluid distribution media 17 and the first and second separator plates 32,34 are constructed of electrically conductive materials and that electrical contact is established therebetween at one or more electrical contact regions 44 where an electrically conductive path is formed between a substrate sheet (32 or 34) and the corresponding porous media (21 or 22). Further, it is preferred that the electrical conductivity is likewise established through the bulk of the porous media 17 and through the electrical contact regions 29 to the electrodes 13.

Each surface 38, 40 has a flow field that is defined by a plurality of lands 48 which define therebetween a plurality of grooves 50. The fuel cell's reactant gases (i.e., $H_2$ or $O_2$) flow through the grooves and are distributed to the MEA 10. When the fuel cell is fully assembled and compressive force is applied, the lands 48 press against the porous media layers 21,22 which, in turn, press against the MEA 10.

First external surfaces 60 of the fluid distribution media 17 refers to those surfaces (i.e., surfaces 26,30) of the first and second fluid distribution media layers 21,22 which contact the substrate element sheets 32,34. Second external surfaces 62 (i.e., 24,28) of the fluid distribution media 21,22 are exposed to major surfaces 64 of the MEA 10.

Preferred materials of construction for the separator plate substrates 32,34 include conductive metals, such as stainless steel, aluminum, and titanium, for example. In certain embodiments, the separator element 32,34 material forms metal oxides when subjected to oxygen. Some suitable materials of construction for the separator plate substrates 32,34 are higher grades of stainless steel that exhibit high resistance to corrosion in the fuel cell, such as, for example, 316L, 317L, 256 SMO, Carpenter 20, Inconel 601, Alloy 276, and Alloy 904L.

The several components depicted in FIG. 1 and described above are generally assembled together with other fuel cells to form a stack (not shown). During normal operations a fuel cell stack is operated under compressive force creating intimate contact between the several components. Presently, this external compressive force ranges from about 25 to about 600 psi (approximately 170 kPa to about 4200 kPa). However, as appreciated by one of skill in the art, the pressure may vary from this range and still will be equally applicable to the present invention.

Typical diffusion media currently used in the art is porous with about 70%-90% voids, and generally is constructed carbon or graphite fibers, and is generally in the form of paper or cloth. Other types of diffusion media known in the art are constructed of metals, such as noble metal mesh screen. One such commonly used commercially available diffusion media is a graphite-fiber paper made by Toray Carbon Fibers America, Inc. However, many of the conductive diffusion media papers or cloths have rough surfaces with protrusions extending therefrom, primarily due to the nature and structure of the fiber based material and manufacturing processes associated therewith. While these materials are somewhat flexible, they are not generally capable of substantial compression or significant compliant deformation. Such diffusion media have the potential to cause wear and tear on the MEA 10 and shorten its lifespan. Additionally, protrusions from the fiber-based diffusion media may impinge on the MEA 10 and/or PEM 12 and become imbedded when pressure is applied during fuel cell operations. The diffusion media protrusions conduct electricity and may be long enough to partially or fully penetrate the membrane 12, creating potential electrical defects in the fuel cell 9 requiring complete replacement. Hence, there have been some efforts to add a conductive compliant microporous buffering layer between the diffusion media 17 and the MEA 10, such as commercially available CARBEL products available from W. L. Gore Company.

However, inclusion of such a layer can add significant electrical resistance, as well as additional expense in fabricating a fuel cell. Previously heretofore, it has not been contemplated to eliminate the traditional fiber-based electrically conductive diffusion media from the fuel cell assembly. However, the present invention eliminates the need for such a fiber-based diffusion media, by providing a fiberless compliant microporous fluid distribution media having sufficient electrical conductivity to be used in lieu of traditional fiber-based diffusion media.

Electrically Conductive Fiberless Fluid Distribution Media

In preferred embodiments of the present invention, the fluid distribution media 17 comprises an electrically conductive fiberless microporous media (with renewed general reference to FIGS. 1 and 2). It is also preferred that the distribution media 17 is compliant and preferably is capable of elastic deformation in at least two directions, so that it is axially compliant and can also be compressed, as will be described below. Preferred embodiments of the media layer are "microporous" meaning that a majority of the pores in the fluid distribution media layer 17 have pore sizes of less than about 2 nm. Since these openings are disposed internally within the body 78 of fluid distribution media layers 17 (e.g., 21,22) the surfaces of the openings are referred to as internal surfaces 86, or the media interior. It is preferred that the fluid distribution media 17 is highly porous (i.e. about 60%-80% pores) having a plurality of pores 76, preferably micropores, formed within a body 78 of the fluid distribution media 17. The plurality of pores 76 comprise a plurality of internal pores 80 and external pores 82 that are open to one another and form continuous flow paths or channels 84 throughout the body 78 that extend from a first external surface 60 to the second external surface 62 of the fluid distribution media 17. Internal pores 80 are located within the bulk or body 78 of the fluid distribution media 17 and external pores 82 end at the distribution media layer 17 surfaces, for example, 60 or 62.

Thus, preferred fluid distribution media 17 is non-metallic electrically conductive fiberless material that comprises a porous polymer. In one embodiment, the material of the media layer 17 comprises polytetrafluoroethylene (PTFE) or derivatives thereof, and further has conductive particles distributed therein to impart electrical conductivity to the material. PTFE is also known as Teflon®. As appreciated by one of skill in the art, the loading of conductive particles in the polymer is dependent upon the necessary electrical conductivity, balanced with the necessary diffusion and gas permeability needed through the porous structure, as the conductive particles generally occlude the pores that they occupy. It is preferred that the conductive particles have a non-fibrous geometry that does not have an evident long axis with respect to which the particle body is symmetrical, in essence a spherical shape.

Expanded polytetrafluoroethylene (ePTFE) and its microporous properties and characteristics are described in U.S. Pat. No. 3,953,566, that is incorporated by reference in its entirety. Desirable characteristics of ePTFE include a structure in which nodes are connected by fibrils. Other microporous materials include any woven or non-woven, microporous materials which are substantially fiberless. This includes materials such as conductive carbon coated on fiberless polymeric mesh or carbon cloth with no z direction fibers. The microporous substrate is preferably selected to maintain its integrity at temperatures up to about 200° C.

Preferably, the conductive particles used are carbon particles, and together the ePTFE combined with the carbon particles forms "carbonized ePTFE." The carbon particles have an average pore size (radius) in the range of about 50 to about 200 Angstroms (A). The average pore size is achieved by ball-milling which produces a suitable distribution of pore sizes and relatively random distribution of equivalent particle spherical diameters. Desirably, each carbon particle has an equivalent average spherical diameter less than about 35 nm, and in a range of about 25 to about 35 nm. Examples of suitable spherical carbon particles include those obtained from Cabot Corp. and sold under the name of "Vulcan XC-72R." The Vulcan XC-72R carbon particles are ball-milled to enhance their properties. The carbon particles can also be obtained from Noury Chemical Corp., and sold under the name of "Ketjen black." The Ketjen black particles are used in an as-received condition.

A particularly preferred distribution media layer 17 material comprises an expanded polytetrafluroethylene (ePTFE) having conductive carbon particles distributed within the body, or a "carbonized ePTFE." In one embodiment, the ePTFE starting material has approximately 70-80% by volume pores and 20-30% PTFE. Then, the "carbonized ePTFE" is formed by impregnating the microporous ePTFE with a plurality of conductive carbon particles, generally by casting a solvent slurry of a low boiling point solvent containing the carbon particles. The ePTFE is exposed to the slurry (preferably by immersion or dipping), however, it is not fully imbibed, so as to leave a predetermined portion of the pores free of carbon particles for maintaining permeability for reactant gas diffusion. In alternate embodiments, a matrix of conductive particles and PTFE can be formed, and then the expansion process can be applied to create the desired porosity.

One such known carbonized ePTFE that is preferred as a fiberless microporous fluid distribution media 17 comprises approximately 70% by volume pores, has an uncompressed thickness of about 2.5 mils (or approximately 65 µm) which is commercially available from the W. L. Gore Company under the trade name CARBEL mp30z. Another electrically conductive fiberless compliant fluid distribution media 17 preferred for certain embodiments of the present invention comprises carbonized ePTFE having approximately 70% by volume pores, an uncompressed thickness of about 5 mils or approximately 130 µm is also sold by W. L. Gore Company as the product CARBEL 300.

Treatment of Fluid Distribution Layers

The present invention provides a reduced electrical resistance (i.e., increased electrical conductivity and hence increased electron transfer) from the interface of the electrode major surface 64 to the microporous fluid distribution media layer 17 surface 62 as compared to an electrical resistance of a comparative microporous media constructed of the same material but having non-metallized electrical contact regions with a similar MEA. In alternate preferred embodiments, the present invention further provides an overall reduction in the electrical resistance of the fuel cell assembly, by reducing the overall electrical resistance of the several assembled components of the fuel cell 9 via reduced resistance at interfaces with both surfaces 60,62 of the fluid distribution media layers 17 confronting the MEA 10 and separator element substrates 32,34, respectively.

In accordance with one embodiment of the present invention, a conductive metal is coated on the outer surfaces 81 of the pores 76 of the microporous fluid distribution media 17 to form one or more metallized regions 88. Applying metallized regions 88 to distribution media 17 is generally taught in co-pending and commonly assigned U.S. patent application Ser. No. 10/850,550 filed on May 20, 2004, which is herein incorporated by reference in its entirety. The metallized regions 88 are formed along the second external surfaces 62 of the microporous media layer 17 that confront the major surfaces 64 of the MEA electrodes 13. The metallized regions 88 integrated with the microporous fluid distribution media layer 17 at the second external surface 62 have been demonstrated to sustainedly reduce contact resistance when compared with comparable microporous fluid distribution media layers having no metal coating or metallized regions. It is preferred that the contact resistance at the interface of the electrodes 13 with the metallized regions 88 of electrically conductive microporous fluid distribution element 17 of the present invention is less than 30 mOhm.cm$^2$ and more preferably less than 15 mOhm.cm$^2$. Although not limiting to the manner in which the present operation operates, it is believed that the conductive metallized regions 88 at the contact surface 62 of the microporous fluid distribution media 17 provide an improved electrical interface at the contact regions 29 by providing a more electrically conductive interface (via the metallized regions 88) and further may be impacted by contacting more similar materials (i.e. catalyst metals 19) with correspondingly similar molecular and physical characteristics (e.g. surface energies). Thus, the present invention provides enhanced electrical conductivity, and consequently permits the use of a fiberless microporous material as the fluid distribution media 17 and further may allow for the ability to lower catalyst 19 loading in the electrodes 13 by such improved electrical conductivity, hence reducing fabrication cost for the fuel cell assembly 9.

In one preferred embodiment according to the present invention, the one or more metallized regions 88 are ultra-thin and applied along the second external surface 62 of the fluid distribution media 17. "Ultra-thin" layers of conductive metal deposited within the metallized regions 88 refers to thicknesses less than about 40 nm, and most preferably less than 15 nm. The thickness of the metallized regions 88 is preferably less than about 10 nm, more preferably from between about 2 to about 10 nm, and most preferably between about 5 to about 10 nm along the surface 62 adjacent to the electrodes 13 of the MEA 10. It has been found experimentally that optimal water management (where sufficient water is retained to permit humidification of the membrane 12, while not flooding the electrodes 13) corresponds in certain embodiments to those where the thickness of the metallized region 88 on microporous media layers 17 along the cathode side 16 of the MEA 10 is between about 5 to about 10 nm, as will be described in more detail below.

It is preferred that the metallized regions 88 are electrically conductive, oxidation resistant, and acid-resistant and in certain preferred embodiments the electrically conductive metal forming the metallized region comprises a compound containing a noble metal, selected from the group consisting of: ruthenium (Ru), rhodium (Rh), palladium (Pd), silver (Ag), iridium (Ir), platinum (Pt), osmium (Os), and mixtures thereof. Such compounds may comprise elemental forms of the conductive metal, or may comprise conductive compounds of metal nitrides, metal oxides, and metal carbides. Other preferred metals for the metallized regions 88 include those that comprise chromium (Cr), titanium (Ti), or tin (Sn). Electrically conductive compounds comprising such metals include, by way of example, chromium nitride (CrN), doped-tin oxide (SnO), and doped titanium oxide (TiO). A most preferred conductive metal for the metallized regions 88 comprises gold (Au). As recognized by one of skill in the art, the conductive metal composition may comprise mixtures of the above identified metals or distinct metallized regions 88 having different metal compositions.

In the embodiment shown in FIG. 1, both the first and second fluid distribution layers 21,22 comprise metallized regions 88 on the surfaces facing the MEA 10. However, while not shown, but as appreciated by one of skill in the art, alternate preferred embodiments of the present invention apply to a fuel cell assembly 9 having metallized regions 88 on only one of the first or second fluid distribution layer surfaces 24,28 facing the MEA 10, rather than being applied to both the first and second fluid distribution layers 21,22, as shown.

Figure 3:
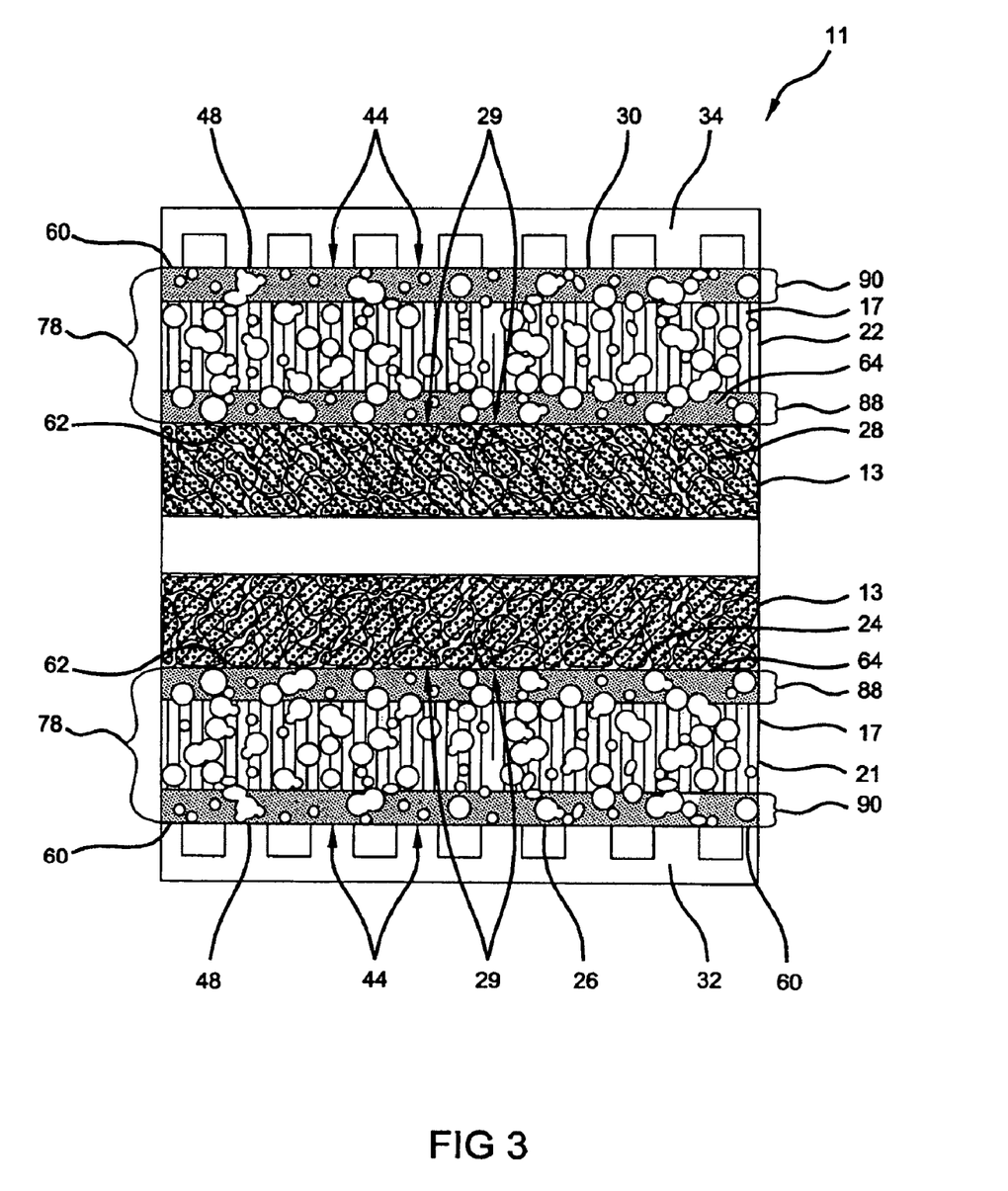
FIG. 3 is a not-to-scale side-sectional view of an alternate embodiment according to the present invention comprising metallized regions along the entire surface of a layer of microporous fluid distribution media facing an MEA and having metallized regions along an entire surface of microporous media facing separator plates.

FIG. 3 shows an alternate preferred embodiment of the present invention. Many aspects of the fuel cell assembly 11 are the same as the previous embodiment shown in FIG. 1. The second surfaces 62 of the fluid distribution microporous media layer 17 preferably comprise the same metallized regions 88 as described above to reduce the electrical resistance at the contact regions 29 between the microporous media layer 17 and the electrodes 13. However, in the present embodiment, the first external surface 60, which is the side opposite to the second surface 62 of the microporous media layer 17, is additionally coated with a conductive metal to form one or more metallized regions 90. The metallized regions 90 of the surfaces 26, 30 of respective microporous media layers 21, 22 preferably contact the metal substrates 32,34 to form the electrical contact regions 44. It is believed that the metallized regions 88,90, and most particularly 90, on the microporous fluid distribution media 17 provide more even electrical current distribution through the body 78 of the media 17 as the current approaches the discrete and non-continuous contact regions 44 associated with the lands 48 of the flow field configuration on the separator plate substrates 32,34.

In an alternate preferred embodiment, where the first external surface 60 comprises metallized regions 90, it is preferred that the thickness of the metallized regions is less than 80 nm, preferably less than 50 nm, and most preferably between about 2 to about 10 nm. In certain preferred embodiments of the present invention, the thickness of the metallized regions 90 is less than or equal to the depth of two atomic monolayers of the metal selected for the coating 90. The thicknesses of the respective metallized regions 88,90 may differ depending on the application, and desired thicknesses are related to both electrical conductivity and desired fuel cell operating conditions, including water management. However, the electrically conductive metal of the metallized regions 90 is preferably selected from the same compositions described above for the metallized regions 88. Likewise, the conductive metals of metallized regions 88 and 90 may be independently selected from one another, or may comprise the same composition, including the same electrically conductive metal(s). It is preferred that the conductive metallized regions 88,90 coat the external pore 82 outer surfaces 81 and the surfaces 86 of the internal pores 80 and extends into the body 78 of the fluid distribution media 17 at a depth of at least about 2 to about 10 nm from respective surfaces 60 or 62.

Figure 4:
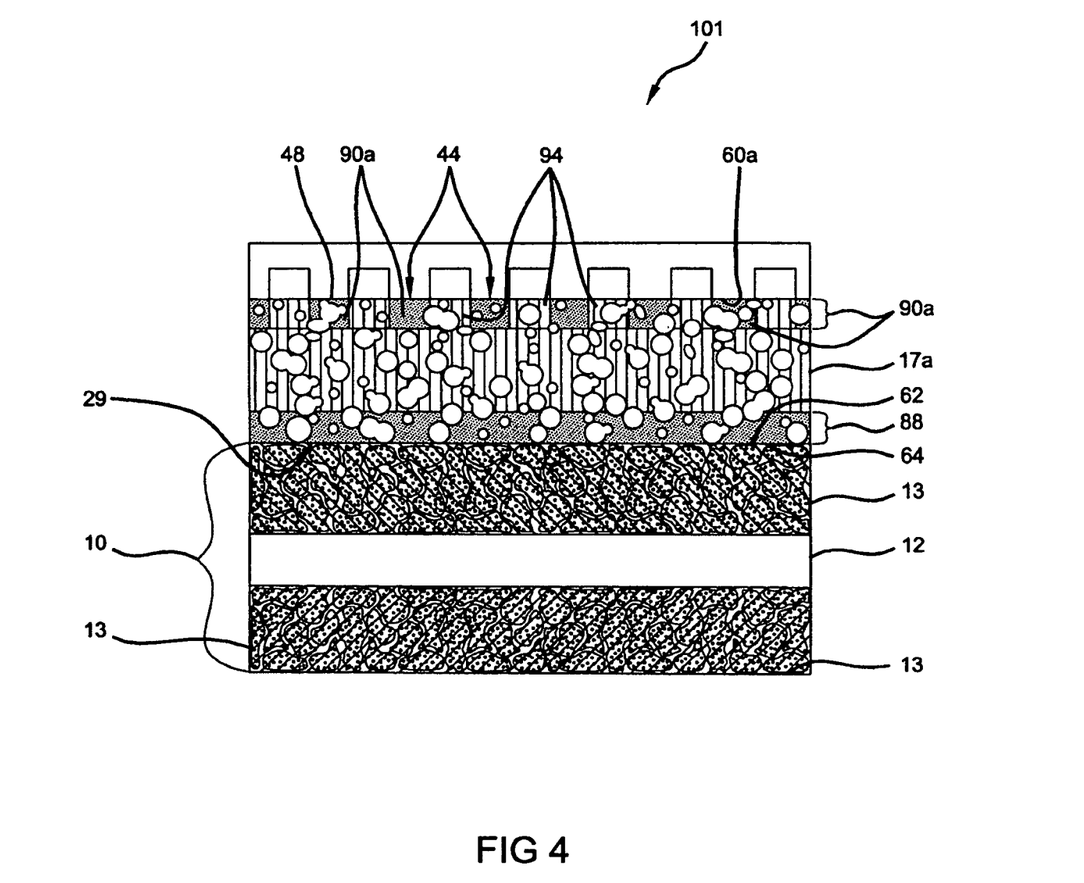
FIG. 4 is a not-to-scale partial side-sectional detailed view of a single layer of fiberless microporous media adjacent to an MEA according to an alternate preferred embodiment of the present invention having metallized regions along the entire surface of the layer of microporous media facing an MEA and along a surface of microporous media facing separator plates where the metallized regions are discrete.

FIG. 4 shows another preferred embodiment of the present invention, depicting the MEA 10 and one-half of the fuel cell assembly 101. As appreciated by a skilled artisan, the present embodiment may also be employed along both sides of the MEA 10 to form the fuel cell assembly 101. The MEA 10 comprises the same elements as described in previous embodiments, including two electrodes 13 and a membrane 12. The fluid distribution media 17a comprises a first surface 60a and a second surface 62. The second surface 62 facing the major surface 64 of the MEA 10 has metallized regions 88 preferably at electrical contact regions 29, formed in the same manner as previous embodiments.

The second surface 60a of the fluid distribution media 17a comprises discrete metallized regions 90a of the microporous media 17 which correspond to electrically conductive contact regions 44 of the external surface 60a, and the non-metallized regions 94 correspond to the electrically non-conductive regions. Electrically conductive metallized regions 90a include those areas that contact lands 48 and establish the electrically conductive path at the contact regions 44. In previously described embodiments, such as that in FIG. 3, the metallized regions 90 entirely cover the continuous external surface 60 which promotes more even current distribution into the body 78 of the microporous media 17. In the embodiment of FIG. 4 with discrete metallized regions 90a corresponding to electrically active contact regions 44, the electrically non-conductive and non-metallized regions 94 of external surfaces 60a are covered or masked while the conductive metal of the metallized regions 90a is applied. A mask is any material that is applied to a substrate and remains stable during coating application. Often, mask materials are selected to permit recovery and recycling of the metals deposited over the mask during the deposition process, and are well known in the art. Preferred mask materials compatible with the present invention include, by way of example, metals, such as stainless steel and titanium, or silicon and alumina based ceramics.

One advantage of the present invention relates to water management of the fuel cell. Typically, product water is generated in the fuel cell reaction and rejected at the cathode 16 where the water typically escapes by simple flow or by evaporation. However, means may be provided if desired, for collecting the water as it is formed to carry it away from the fuel cell 9. Good water management enables successful long-term operation of electrochemical fuel cell 9. Spatial variations of water content within the membrane 12 of a current-carrying fuel cell result from the electro-osmotic dragging of water with proton ($H^+$) transport from anode 14 to cathode 16, the production of water by the oxygen reduction reaction at the cathode 16, humidification conditions of the inlet gas stream, and "back-diffusion" of water from cathode 16 to anode 14. Further, for currently employed PEM membranes 12, the optimal efficiency of the fuel cell occurs where the outlet humidity from the cathode is 100% relative humidity or greater. Previously, to achieve this humidity, both the anode 14 and cathode 16 reactant streams were externally humidified prior to entering the fuel cell 9, which necessitated humidification equipment. Maintaining sufficient water content in the fuel cell to prevent drying of the membrane has typically been a significant problem during operations, thus, the inlet streams to both the anode and cathode are humidified, usually to a target of at least 100%.

One advantage of the present invention relates to eliminating and/or reducing the need for external humidification of the cathode 16 and/or anode 14 inlet stream. It has been discovered that where the fiberless microporous sample (e.g., CARBEL fluid distribution media) was prepared with metallized regions along both sides and used in a fuel cell that was operated to have a typical inlet humidity to the cathode of 100% relative humidity (which is a standard target for cathode inlet humidity), the fuel cell was inundated with excess water and in some circumstances flooded. Thus, in contravention to known prior art, the present invention reduces the need for external humidification of inlet reactant streams to the MEA and provides sustained membrane durability by providing consistent MEA humidification.

Methods

One embodiment of the present invention provides a method for manufacturing an assembly for a fuel cell, comprising depositing an electrically conductive metal on a surface of an electrically conductive fiberless microporous media to form one or more metallized regions having an ultra-thin thickness, wherein the microporous media comprises carbonized expanded-polytetrafluroethylene (ePTFE). The surface having the metallized regions is positioned adjacent to an electrode of a membrane electrode assembly (MEA). The electrode is later contacted with the surface having the metallized regions to form an electrically conductive path between the substrate and the microporous media.

A variety of depositing methods may be employed to apply the conductive metal compositions that form the metallized regions (e.g., 88, 90, 90a) of the fluid distribution media 17. One preferred method of depositing the conductive metal of the metallized regions 88,90 onto the fluid distribution microporous media 17 is by an ion-assisted, physical vapor deposition (PVD) method, which is well known in the art and described in depth in co-pending and commonly assigned U.S. patent application Ser. No. 10/850,550 filed on May 20, 2004, as previously discussed. Noble metals are generally deposited on the substrate by the ion-assisted PVD at a rate of 0.10 nm/s to a thickness of less than 80 nm, which is observed by thickness monitors known in the art. The metallized regions 88, 90, 90a may have conductive metal deposited onto the substrate at ultra-low thicknesses of less than 80 nm, preferably less 40 nm, and most preferably about 2 to about 10 nm. When the metallized region 88,90 has a thickness of at least about 2 nm, it is preferably that the loading is 0.02 mg/cm$^2$. The use of ion-assisted, PVD apparatus allows the electrically conductive metal to be deposited on the substrate very smoothly, evenly, and in an ultra-thin layer on the order of 2 to 20 nm, thereby achieving relatively uniform and good surface coverage, and good adhesion.

Another preferred PVD method that is also suitable for the application of ultra-thin conductive metals is magnetron sputtering or electron beam evaporation. Other preferred methods of applying a metal coating (88, 90, 90a) according to the present invention include electroplating (e.g. electrolytic deposition), electroless plating, chemical vapor or pulse laser deposition.

Preferred embodiments of the present invention provide a low contact resistance across the separator plate substrates 32,34 through the microporous media 17 having the metallized regions 88, 90, 90a to the electrodes 13 of the MEA 10. It is preferred that the contact resistance across an entire fuel cell (from separator plate to separator plate) is less than 100 mOhm.cm$^2$ (m$\Omega$.cm$^2$) and more preferably less than 80 m$\Omega$.cm$^2$ where the several components of the fuel cell are contacted with one another under compressive force. Additionally, under compressive force, any protrusions or sharp edges from the fuel cell components, such as the lands 48 of the separator plates, e.g., 32,34, have the potential to damage the MEA 10. One aspect of the microporous distribution media layer 17 is that it is constructed of a pliable, compressible, and compliant material, such that it protects the MEA 10 from any potential damage and as such, prolongs the lifespan of the fragile MEA 10 by absorbing and distributing any pressure points, while serving as the reactant fluid distribution media 17.

Further, in certain embodiments of the present invention, electrically conductive substrate elements 32,34 do not require the removal of a passivation layer (i.e. metal oxide layer) from the metallic separator plate substrates 32,34 along contact surfaces 38,40 prior to their incorporation into the fuel cell assemblies (for example, 9, 11, 101) of the present invention. Generally, a metal substrate 32,34 having an oxide layer that contacts a non-metallic fluid distribution layer (without metallized regions 90) creates an impermissibly high electrical contact resistance. Thus, prior art methods of removing the oxide layer include a variety of methods, such as cathodic electrolytic cleaning, mechanical abrasion, cleaning the substrate with alkaline cleaners, and etching with acidic solvents or pickle liquors. Eliminating the necessity for removing the metal oxides from the contact surfaces 38,40 of the metallic separator plate 32,34 is thus optional in accordance with certain embodiments of the present invention.

In one embodiment of the present invention, the separator element substrates 32,34 comprise stainless steel and the substrate surfaces 32,34 do not require extensive removal of a passivation layer from the contact surface 38,40, such as disclosed in commonly assigned U.S. patent application Ser. No. 10/704,015 filed on Nov. 7, 2003 and incorporated herein in its entirety. The improved electrical conductivity at the interface at the contact regions 44 provided by the metallized region coating 90 on the microporous media 17 permits use of metals in the separator element substrates 32,34 that have a naturally occurring oxide layer at the contact surface 38,40.

Hence, the present invention eliminates or significantly simplifies the costly and time intensive pre-processing step of removing some or substantially all of the metal oxides from the contact surface 38,40 of the metal substrates 32,34. Further, higher grades of stainless steel previously discussed have a high corrosion resistance, and thus can be used without any further protective treatment due to their ability to withstand the corrosive environment within the fuel cell. In certain embodiments of the present invention, it is preferred that the contact surfaces 38,40 of the separator element metal substrates 32,34 are essentially clean, where loosely adhered contaminants are removed by any method known to one of skill in the art, prior to incorporation into the fuel cell assembly.

In alternate embodiments, the separator plate element substrates 32,34 are coated with electrically conductive protective coatings that provide corrosion resistance to the underlying metal substrate 32,34. Such coatings may comprise oxidation and corrosion resistant metal coating 90 layers (e.g. Au, Ag, Pt, Pd, Ru, Rh, Ir, Os, and mixtures thereof) or corrosion resistant electrically conductive polymeric matrices, which generally comprise oxidation resistant polymers dispersed in a matrix of electrically conductive corrosion resistant particles, as are known in the art. The protective coatings preferably have a resistivity less than about 50 Ohm.cm ($\Omega$.cm). In such an embodiment, where the surfaces 38,40 are overlaid with a protective coating, the metal substrates 32,34 comprise a corrosion-susceptible metal such as aluminum, titanium, or lower grade stainless steel that is coated with a corrosion resistant protective coating.

In another embodiment, the present invention provides a method of operating a fuel cell comprising positioning an electrically conductive fiberless microporous distribution media layer between a membrane electrode assembly (MEA) and an electrically conductive substrate. The microporous media has a first surface confronting the MEA and a second surface confronting the conductive substrate. One or more regions of the first surface contact the MEA and likewise, the second surface has one or more regions that contact the adjacent substrate to form an electrically conductive path from the substrate through the microporous media to the MEA. Electrons are conducted to or from the MEA via the path while operating the fuel cell.

A reactant stream is introduced to a cathode side of the MEA while operating the fuel cell. The reactant stream is delivered through the conductive microporous media and does not require external humidification in certain embodiments. In such embodiments, the reactant stream delivered to a cathode side of the MEA consists essentially of ambient air, and the ambient air is not intentionally humidified, or in the alternative the ambient air has a relative humidity of less than ambient conditions.

In alternate preferred embodiments, the reactant stream introduced to the cathode side of the MEA for the reaction is externally humidified prior to entry into the MEA at less than saturation conditions. The reactant stream introduced to a cathode side of the MEA has a water content of less than a saturation level. In alternate preferred embodiments, the second surface of the microporous media further comprises one or more metallized regions comprising an electrically conductive metal for reducing electrical resistivity between the substrate and the microporous media. As appreciated by one of skill in the art, the microporous media according to the present invention may be arranged on both sides of the MEA.

In some prior art embodiments, coating the metal substrate of the bipolar plates, in particular stainless steel substrates, with a protective metal coating has created high MEA contamination, which can lead to poisoning of the catalyst (and hence catalyst inactivation) or overall deactivation of the proton conductive material in the membrane and electrodes over the lifespan of the fuel cell. However, in embodiments where the stainless steel forms a passivation layer of metal oxides, such contamination does not generally occur. Thus, an additional advantage of the present invention, is the optional use of an untreated stainless steel separator plate that forms a protective metal oxide layer, which reduces MEA contamination, and thus reduces the potential of catalyst poisoning and overall inactivation of the membrane and electrodes.

EXAMPLE 1

Experimental details regarding one preferred embodiment of the present invention will now be described in detail. As previously described, CARBEL mp30z is a microporous fiberless carbonized ePTFE having 70% by volume pores, an uncompressed thickness of about 2.5 mils, and is commercially available from the W. L. Gore Company. In the experiment, gold is deposited by ion-asssisted PVD onto the CARBEL by a Teer magnetron sputter system. The CARBEL media is introduced into the vacuum chamber and when the pressure in the vacuum chamber reaches $5 \times 10^{-5}$ the deposition of Au is commenced. The magnetron targets are 99.99% pure Au. The Au deposition is done at −50V bias potential using 0.25 A current for one minute to achieve a gold coating thickness of 10 nm. Au is deposited at a rate of 0.16 nm/s using magnetron sputter system. The thickness of the samples is calibrated using electron probe microanalysis (EPMA). The deposition temperature is preferably about 25° C. to about 30° C.

EXAMPLE 2

In an alternate method of deposition by electron beam evaporation, the CARBEL mp30z media material, as described above, is introduced into the load lock of an ultra-high vacuum electron-beam evaporation chamber. After the load lock pressure reaches $10^{-7}$ torr, the sample is transferred to the main deposition chamber. The base pressure of the chamber is $5 \times 10^{-9}$ torr. Au is deposited at a rate of approximately 0.05 nm/s using electron-beam evaporation. The rate of deposition is controlled by a quartz crystal microbalance and is calibrated using EPMA. The deposition temperature is preferably about 25 to about 30° C. The quantity of Au deposited can be verified by placing atomically flat single crystal pieces of silicon and simultaneously depositing Au on the silicon and verifying the quantity using the EPMA.

Figure 5:
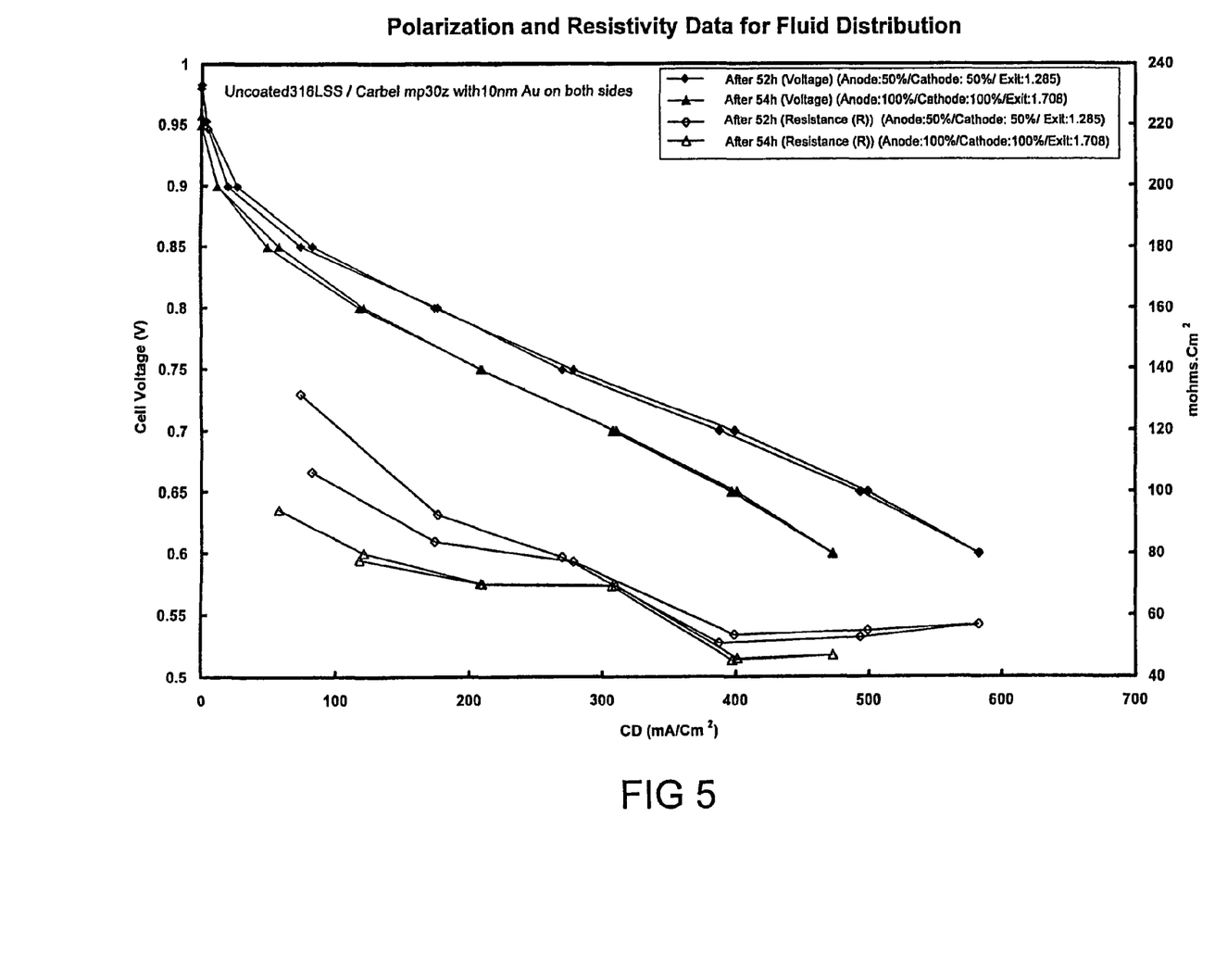
FIG. 5 is a graph of contact resistance and voltage values achieved by an electrically conductive fiberless microporous fluid distribution media element according to the present invention, wherein the relative humidity of the cathode inlet is varied to demonstrate overall cell performance.

In FIG. 5, Samples were tested on a 50 cm$^2$ LANL hadware using a Teledyne test stand. Testing was conducted at different cathode inlet relative humidity levels to demonstrate the improved water management aspects of the present invention. The fuel cell assembly used was arranged to have a Gore MEA 5510 with 0.4 mg/cm$^2$ loading of Pt catalyst and a 25 μm thickness was sandwiched between CARBEL mp30z microporous fiberless distribution media layers treated in accordance with Example 2 above. The gold was deposited on both an interior and an exterior surface which are bounded by and in contact with an untreated 316L stainless steel impermeable substrate. The fuel cell was operated with the following conditions: 25 psig (approximately 175 kPa), hydrogen to air stoichiometric ratio of 2/2. In all operating scenarios, the fuel cell operating temperature was about 80° C. The fuel cell ran for 24 hours at a constant current density of 1 A/cm$^2$. Polarization curves were taken after activation with different levels of humidification. The cathode inlet relative humidity (RH) was varied in the following amounts: approximately 50% and 100%. The anode inlet relative humidity was likewise modified to 50% and 100% relative humidity.

The 50% RH cathode inlet/50% RH anode inlet demonstrated an improved performance over the 100% RH cathode inlet/100% RH anode inlet. An improvement of 20 to 50 mV was observed by decreasing the relative humidity from 100%/100% to 50%/50%, while cell resistance was similar. Thus, according to the present invention, the membrane is operated under favorable saturation conditions on the cathode side, while little to no additional external humidification is necessary.

Fuel cell assemblies prepared in accordance with the present invention are highly efficient and have enhanced performance. Conductive fiberless microporous fluid distribution media according to the present invention improves fuel cell water management by eliminating the need for external humidification of the cathode inlet stream while maintaining adequate hydration of the membrane in the MEA leading to a prolonged MEA lifespan.

The present invention also provides an improved electrical interface between the non-metallic microporous fluid distribution media and the electrodes of the MEA, which reduces electrical resistance and increases catalyst activity. Such increased catalyst activity can reduce the catalyst loading requirements in the electrodes of the MEA and thus reduce manufacturing expenses. Further, alternate preferred embodiments of the present invention likewise reduce the electrical resistance between the non-metallic microporous fluid distribution media and the metallic substrate of the separator element, to provide an overall lower electrical resistance across the fuel cell. The metallized regions of the present invention provide an ultra-thin conductive metal coating that sufficiently covers the surface of the microporous fluid distribution element to provide a low contact resistance for an electrically conductive fluid distribution element, which improves the overall performance of a fuel cell. Furthermore, the thickness of the metal coating is such that the manufacturing cost of preparing an electrically conductive fluid distribution element is minimized.

Processing costs are further reduced by eliminating the step of removing metal oxides from metal substrates that will form an electrical interface with the fluid distribution element. The improved electrical interface reduces contact resistance and promotes more widespread and even current distribution, which will increase the operational efficiency and overall lifetime of the membrane and the fuel cell stack. Furthermore, the present invention also enables the traditional distribution media layers (fiber-based) to be omitted from the fuel cell assembly architecture, which can promote fuel cell durability and longevity, as well as cost reductions in fuel cell fabrication costs.

The description of the above embodiments and method is merely exemplary in nature and, thus, variations that do not depart from the gist of the invention are intended to be within the scope of the invention. Such variations are not to be regarded as a departure from the spirit and scope of the invention.

What is claimed is:

1. A fluid distribution element for a fuel cell having a membrane electrode assembly (MEA), the element comprising:
   a layer comprising an electrically conductive expanded polytetrafluoroethylene microporous distribution media having electrically conductive particles of non-fibrous geometry distributed therein and having one or more metallized regions on a surface of said layer, said one or more metallized regions contacting a major surface of the MEA and forming respective electrically conductive paths between the MEA and said media, wherein the MEA comprises an anode configured to receive a first gaseous reactant, a cathode configured to receive a second gaseous reactant, and a proton exchange membrane (PEM) disposed between said anode and cathode.

2. The element of claim 1, wherein said surface of said media layer is a first surface and said media layer further comprises a second surface opposite to said first surface, wherein said second surface has one or more metallized regions and faces an electrically conductive impermeable separator plate that is arranged in contact therewith to form one or more electrically conductive pathways.

3. The element of claim 2, wherein said separator plate has regions of metal oxides formed along contact regions of a separator plate surface, wherein said contact regions correspond to said one or more electrically conductive pathways.

4. The element of claim 2, wherein said separator plate has a surface facing said media layer which is patterned with a plurality of grooves and lands, and wherein said lands are in contact with said one or more metallized regions of said second surface of said media layer.

5. The element of claim 4, wherein said media layer is compliant and compressible and conforms to said lands and grooves to minimize deformation of the MEA when compressive force is applied across said separator plate through said layer to the MEA.

6. The element of claim 1, wherein each of said metallized regions provides a reduced electrical resistivity through said respective electrically conductive paths as compared to a comparative non-metallized layer of microporous media.

7. The element of claim 1, wherein said one or more metallized regions have an ultra-thin thickness less than about 10 nm.

8. The element of claim 1, wherein said one or more metallized regions comprises an electrically conductive metal deposited on surfaces of pores of said microporous media in said metallized regions.

9. The element of claim 1, wherein said electrically conductive particles of non-fibrous geometry of said microporous media comprise carbon particles that form a carbonized expanded-polytetrafluoroethylene (ePTFE).

10. The element of claim 1, wherein said metallized regions comprise one or more metals selected from the group consisting of Ru, Rh, Pd, Ag, Ir, Pt, Os, Ti, Cr, Sn, and Au.

11. The element of claim 1, wherein said electrically conductive metal comprises Au.

12. A method of operating a fuel cell comprising:
   positioning an electrically conductive expanded polytetrafluoroethylene microporous distribution media comprising electrically conductive particles of non-fibrous geometry distributed therein between a membrane electrode assembly (MEA) and an electrically conductive substrate, wherein said MEA comprises an anode receiving a first gaseous reactant comprising hydrogen, a cathode receiving a second gaseous reactant comprising oxygen, and a proton exchange membrane (PEM) disposed between said anode and cathode, wherein said microporous media comprises a plurality of pores having an average pore size of less than or equal to about 2 nm and has a first surface confronting said MEA and a second surface confronting said conductive substrate;
   contacting one or more regions of said first surface with said MEA and one or more regions of said second surface with said substrate to form an electrically conductive path from said substrate through said microporous media to said MEA; and conducting electrons to or from said MEA via said path while operating the fuel cell.

13. The method of claim 12, wherein said contacting is accomplished by compressive force imparted on the fuel cell in an assembled fuel cell stack.

14. The method of claim 12, wherein a surface of said conductive substrate facing said media is patterned with a plurality of grooves and lands, and wherein said contacting places said lands in contact with said one or more regions of said second surface of said media.

15. The method of claim 14, wherein said distribution media is compliant and compressible, and after said contacting, said distribution media conforms to said lands and thereby minimizes permanent deformation of said MEA.

16. The method of claim 12, wherein at least one of said one or more regions of said first surface or of said second surface are ultra-thin metallized regions having a thickness of less than about 40 nm comprising an electrically conductive metal.

17. The method of claim 16, wherein said at least one or more regions comprises both of said one or more regions of said first surface and said one or more regions of said second surface.

18. The method of claim 12, wherein a reactant stream delivered to said MEA is not humidified or has a relative humidity of less than ambient.

19. A method for manufacturing an assembly for a fuel cell, comprising:

depositing an electrically conductive metal on a surface of an electrically conductive microporous expanded-polytetrafluroethylene (ePTFE) media to form one or more metallized regions having an ultra-thin thickness of less than about 40 nm, wherein said microporous media comprises electrically conductive non-fibrous geometry carbon particles;

positioning said surface having said metallized regions adjacent to an electrode of a membrane electrode assembly (MEA) comprising an anode electrode receiving a first gaseous reactant, a cathode electrode receiving a second gaseous reactant, and a proton exchange membrane (PEM) disposed between said anode and cathode electrodes; and contacting said electrode with said surface having said metallized regions to form an electrically conductive path between a substrate and said microporous media.

20. The method of claim 19, wherein said depositing is conducted by at least one process including electron beam evaporation, magnetron sputtering, plasma-assisted physical vapor deposition, electrolytic deposition, and electroless deposition.

21. The method of claim 19, wherein said electrically conductive metal is one or more metals selected from the group consisting of Ru, Rh, Pd, Ag, Ir, Pt, Os, Ti, Cr, Sn, and Au.

22. The method of claim 19, wherein said electrically conductive metal comprises Au.

23. The method of claim 19, wherein said depositing is conducted to provide said ultra-thin thickness of less than or equal to 15 nm.

24. The method of claim 19, wherein said contacting is accomplished by compressive force imparted on the fuel cell in an assembled fuel cell stack.

* * * * *